United States Patent [19]

Narukawa et al.

[11] Patent Number: 6,084,007
[45] Date of Patent: *Jul. 4, 2000

[54] TRANSPARENT CONDUCTIVE INK

[75] Inventors: Hiroaki Narukawa; Shuhei Hosomi, both of Tokyo; Masachika Taniguchi; Yasushi Nomura, both of Narashino, all of Japan

[73] Assignee: Dai Nippon Printing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/808,658

[22] Filed: Feb. 28, 1997

[51] Int. Cl.$^7$ ........................................ C09D 5/00
[52] U.S. Cl. .......................................... 523/161; 252/512
[58] Field of Search .................... 252/512, 513, 252/514, 515; 524/430, 439, 440, 441; 523/161

[56] References Cited

U.S. PATENT DOCUMENTS

| | | | |
|---|---|---|---|
| 4,018,728 | 4/1977 | Priest | 260/17 |
| 4,243,710 | 1/1981 | Magrini | 428/208 |
| 4,435,214 | 3/1984 | Ehrreich | 75/251 |
| 4,517,118 | 5/1985 | Stoetzer | 524/440 |
| 4,564,563 | 1/1986 | Martin | 428/546 |
| 4,595,606 | 6/1986 | St. John | 524/440 |
| 4,906,596 | 3/1990 | Joslin | 501/17 |
| 4,954,562 | 9/1990 | Anderson | 524/430 |
| 4,962,066 | 10/1990 | Starz | 501/19 |
| 5,174,925 | 12/1992 | Fujii | 252/514 |
| 5,395,876 | 3/1995 | Frentzel | 524/440 |
| 5,504,133 | 4/1996 | Murouchi | 524/430 |
| 5,519,087 | 5/1996 | Tang | 524/430 |
| 5,571,456 | 11/1996 | Bergmann | 252/518 |
| 5,631,311 | 5/1997 | Bergmann | 524/439 |
| 5,648,407 | 7/1997 | Goetz | 524/430 |
| 5,653,918 | 8/1997 | Towlson | 524/439 |
| 5,710,195 | 1/1998 | Subbaraman | 524/31 |
| 5,736,228 | 4/1998 | Morris | 428/195 |
| 5,736,606 | 4/1998 | Yanagi | 524/558 |
| 5,744,519 | 4/1998 | Heraud | 523/161 |

*Primary Examiner*—Paul R. Michl
*Attorney, Agent, or Firm*—Sughrue, Mion, Zinn, Macpeak & Seas, PLLC

[57] ABSTRACT

The present invention provides a transparent conductive ink which is used to form a transparent conductive film by gravure printing on surface of a multicolored picture pattern or an image printed by offset printing and which is suitable for gravure printing, has high blocking resistance and stable attainment of conductive property and provides freshness of color in picture pattern and image. The transparent conductive ink is used to form a transparent conductive film 5 by gravure printing on surface of a multicolored picture pattern 4 printed by offset printing, and it comprises an acrylic thermoplastic resin having glass transition temperature of not lower than 45° C., conductive powder having average particle size of not more than 1 $\mu$m, and a solvent, whereby said conductive ink contains 100 to 500 weight parts of said conductive powder to 100 weight parts of said thermoplastic resin.

3 Claims, 1 Drawing Sheet

TRANSPARENT CONDUCTIVE INK

BACKGROUND OF THE INVENTION

The present invention relates to a transparent conductive ink for forming a transparent conductive film by gravure printing on surface of multicolored patterns printed by offset printing on a base material such as paper. Printed materials with conductivity provided by the transparent conductive ink of the present invention are preferably used for illustrated books and toys for educational purpose.

Teaching materials printed using conductive ink have been known in the past. Such printed teaching material comprises, for example, as shown in a set of questions for learning (FIG. 1) disclosed in Japanese Utility Model Publication Laid-Open 48-20540, a set of questions (question items) 2 printed using non-conductive ink on a base material 1 and a check mark 3 printed with conductive ink (or non-conductive ink). In this case, two or more answers are printed for a question, and check marks are printed to match the answers, and only the check mark for the correct answer is printed with the conductive ink. A pupil or a student can confirm correct answer or incorrect answer by pressing the check marks using a light pen (not shown) for checking, which is lighted up only when electric conductivity is given by a conductive ink layer. Therefore, the teaching material using this type of conductive ink is advantageous in that self-check can be performed quickly by a pupil or a student, and that the teaching material is available for repeated use.

In the conductive ink used in this type of printed materials, carbon powder or silver powder is used as a conductive component. When it is used only for printing of check marks in the teaching materials as described above, there is no problem. However, on the illustrated books for children for education purpose which must be printed with diverse picture patterns, it is not always easy to print multicolored picture patterns or images freely with the conductive ink. Because the conductive ink is not transparent, even when printing pattern with this ink is overlapped on multicolor picture pattern or image, it is not possible to obtain the picture pattern and the image in the color as desired.

In the Japanese Patent Publication Laid-Open 7-57545, a transparent conductive printed material is disclosed, which comprises a conductive sector having an ink layer, a barrier layer and a transparent conductive ink layer of characters or picture patterns deposited sequentially on a printing base material in this order from the side of the printing base material. Then, this is placed on the surface of multicolored picture patterns produced by offset printing, and a transparent conductive film is formed by gravure printing using the transparent conductive ink.

The standard operating condition of this type of gravure printing is characterized by high-speed printing (30 to 120 sheets per minute) and low temperature short-time drying (30 to 60 seconds at 60° C.). The printed materials are stacked (5000–10000 sheets; 1 meter in height; pressure at the bottom: 10 kg/cm$^2$) before the bookbinding is performed. In this respect, the transparent conductive ink used for gravure printing must meet the requirements such as suitability for gravure printing under the above operating condition, high blocking resistance, stable attainment of conductivity and maintenance of freshness of colors in picture patterns and images.

The ink for gravure printing must satisfy the requirements such as limited drying condition, less residual solvent in the dried printed material and quick decrease of residual solvents. For this reason, the solvent contains toluene as major component, and a resin soluble in toluene is generally selected as a binder. Chlorinated rubber resin contains chlorine, which may cause pollution problem when it is incinerated. Alkyd resin has poor drying property and pyroxylin must be simultaneously used, and ketone type or ester type solvent to dissolve pyroxylin must be contained as essential component. If the content of ester type or ketone type solvent is decreased in the composition of the solvent during printing, there is a problem that pyroxylin may be deposited.

The above patent publication discloses a transparent conductive ink having the following composition: polyester resin 10.5%, mixture of tin oxide and antimony pentoxide 24.5%, and mixed solvent of toluene and methylisoburylketone (50%/50% mixture) 65%. This transparent conductive ink is also disadvantageous in that drying property is poor, solvents are very likely to remain in the dried ink, and viscosity varies widely due to change in the solvent composition when the mixed solvent is used.

It is an object of the present invention to provide a transparent conductive ink used when a transparent conductive film is formed by gravure printing on the surface of multicolor picture patterns or images produced by offset printing, whereby the conductive ink has property suitable for gravure printing, high blocking resistance and stable attainment of conductive property, and provides freshness of is color in picture patterns and images.

SUMMARY OF THE INVENTION

To attain the above object, the present invention provides a transparent conductive ink for forming a transparent conductive film by gravure printing on the surface of multicolored picture patterns produced by offset printing, comprising acrylic thermoplastic resin having glass transition temperature of not lower than 45° C., conductive powder having average particle size of not more than 1 μm, and a solvent, whereby the conductive ink contains 100 to 500 weight parts of the conductive powder tc 100 weight parts of the thermoplastic resin.

FIG. 2 is a cross-sectional view of a conductive printed material according to an embodiment printed with the conductive ink of the present invention. On the surface of a picture pattern printing layer 4 on a base material 1, a transparent conductive layer 5 printed with the conductive ink of the present invention is formed.

As the acrylic thermoplastic resin in the transparent conductive ink of the present invention, the following resins may be used: methyl acrylate resin, ethyl acrylate resin, isobutyl acrylate resin, butyl acrylate resin, methyl methacrylate resin, ethyl methacrylate resin, isobutyl methacrylate resin, butyl methacrylate resin, ethyl methacrylate-ethyl acrylate copolymer resin, methyl methacrylate-styrene copolymer resin, methyl methacrylate-ethyl acrylate copolymer resin, urethane modified acrylic resin, polyester modified acrylic resin, etc. Glass transition temperature (Tg) of the resin must be not lower than 45° C. If Tg is lower than 45° C., blocking occurs, and it cannot be completely prevented even when anti-blocking agent is used. Further, Tg is preferably not higher than 105° C. If it is higher than 105° C., the film becomes fragile, and this is not desirable.

As the conductive powder, the following powder may be used: powder having tin oxide as major component and doped with metals having different valences such as antimony, aluminum, boron, etc., powder comprising the above composition coated on a core material such as mica powder, potassium titanate, silica powder, etc., or conductive powder such as zinc antimonate, indium tin oxide, gold, silver, copper, etc. Particle size of the conductive powder must be not more than 1 μm to maintain transparency, and it is preferable that it has low refractive index.

To ensure transparency and conductive property of the coated film, the content of the conductive powder is preferably 100 to 500 weight parts to 100 weight parts of the acrylic resin, or more preferably 180 to 300 weight parts. If the content of the conductive powder is less than 100 weight parts, the conductivity will be $10^{10}$ Ω/□, and this is not suitable for the purpose of the present invention. If the content is more than 500 weight parts, conductive powder is in excess, and transparency (evaluated by cloudiness) of the coated film may be affected. When this is printed on the surface of picture pattern or image, it is difficult to obtain fresh color tone.

As the solvent, toluene, xylene, ethyl acetate, butyl acetate, methylethylketone, methylisobutylketone, methyl cellosolve, ethyl cellosolve, etc. may be used, or mixed solvent of these substances may be used. When air temperature is high during gravure printing, it is preferable to use a mixed solvent of toluene-xylene to attain good printing property.

To produce the conductive ink of the present invention, the acrylic resin, the conductive powder and the solvent are mixed and dispersed using a disperser such as ball mill, sand mill, 3-roll mill, etc. To produce it in small quantity, a paint shaker may be used.

In the present invention, to increase dispersion property of the conductive powder, a dispersion aid such as silane coupling agent or surface active agent may be simultaneously used. Further, to improve blocking resistance or wear resistance, a wax or fine silica powder or fluororesin powder generally used in printing ink may be simultaneously used.

The conductive ink thus prepared can be used in gravure printing on the surface of a layer with multicolor picture pattern and image produced by offset printing on a base material (such as paper, synthetic paper using polypropylene, polystyrene, polyvinyl chloride as base, or synthetic resin film such as polyethylene terephthalate). Then, a conductive film with dried thickness of 0.8 to 5 μm is formed.

In the transparent conductive film according to the present invention, good conductive property can be maintained with surface resistance (25° C.) of not more than $10^9$ Ω/□, or more preferably not more than $1\times10^7$ Ω/□. Accordingly, it is suitable for a light pen for checking, which has sensitivity to distinguish surface resistance of not less than $10^{10}$ Ω/□ from the value of not more than $10^9$ Ω/□ currently in practical use.

In the transparent conductive film of the present invention, cloudiness is preferably not more than 40, or more preferably, not more than 20. If it is more than 40, freshness of the picture pattern may be lost.

The transparent conductive ink layer may be printed by gravure printing on the surface of a layer with multicolor picture pattern or image. By printing in square pattern with line width of 100 μm to several hundreds of μm or in halftone (number of lines as desired) of 50% or more, the better transparency can be maintained and fresh picture pattern can be obtained.

The transparent conductive film of the present invention may be formed by gravure printing on the surface of a layer with multicolored picture pattern or image produced by offset printing via a transparent primer layer. The transparent primer layer can provide a barrier effect to prevent migration of plasticizer contained in the layer with picture pattern or image to the transparent conductive ink layer or an effect to provide uniform and smooth printing surface in forming the transparent conductive ink layer. To form such transparent primer layer, it is recommended to use gravure varnish or OP varnish for offset printing with dried thickness of 1 to 10 μm.

The transparent conductive ink of the present invention has suitable property for gravure printing, high blocking resistance, stable attainment of conductive property and provides freshness of color in picture pattern and image. This ink makes it possible to provide multicolored picture patterns and images having electrical conductivity freely and at high productivity.

DETAILED DESCRIPTION OF THE PREFERRED EMBODIMENTS

Figure 1:
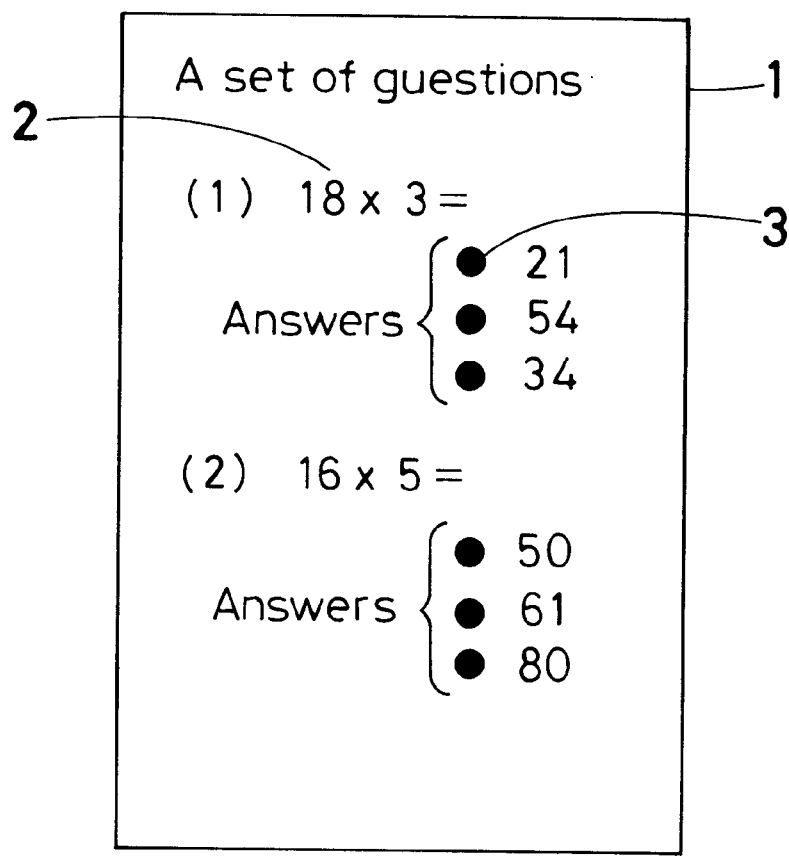
FIG. 1 is a plan view of a teaching material printed with a conventional type conductive ink.
Figure 2:
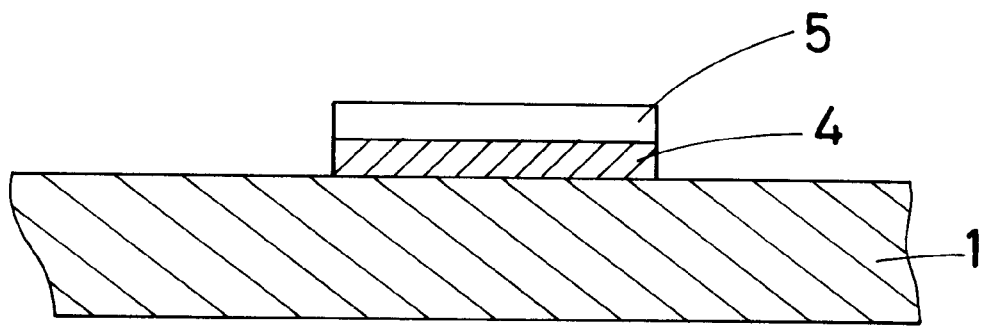
FIG. 2 is a schematical cross-sectional view of a printed material prepared using the transparent conductive ink of the present invention.

In the following, description will be given on embodiments of the present invention. Toluene is used as the solvent component in the acrylic thermoplastic resin used in the embodiments.

EXAMPLE 1

A material having the following composition was placed in a glass bottle of 1-liter volume together with 200 g of glass beads (manufactured by Toshiba-Ballotini Co., Ltd.), and this was dispersed in a paint shaker for 4 hours to have average particle size of 1 μm or less.

| | |
|---|---|
| Acrylic thermoplastic resin solution (Copolymer resin of ethyl methacrylate and ethyl acrylate; Tg 75° C.; solid matters 30%) | 100 weight parts |
| Tin oxide powder (containing antimony pentoxide; average primary particle size 0.2 μm) | 90 weight parts |
| Toluene | 70 weight parts |

The transparent conductive ink thus obtained was measured by toluene using Zahn cup No.3 to adjust to 20 to 25 sec. and was evaluated using sheet-fed gravure printing proof press.

For the evaluation, a printed material partially having multicolored picture patterns printed by offset printing (gloss coat paper of 148 g/m² used as base material) was used, and the ink prepared above was used to print all over the surface with full printing plate. As a result, a transparent conductive film (dried film thickness: about 3 μm) was formed as test specimen.

Using this test specimen, attainment of conductive property on picture pattern, freshness of picture pattern, and blocking resistance when picture patterns were kept overlapped each other were evaluated. The results are shown in Table 1.

EXAMPLE 2

In the ink of Example 1, the acrylic thermoplastic resin solution was totally replaced with an acrylic resin (isobutyl methacrylate resin; Tg 50° C.; solid matters 30%). Transparent conductive ink and test specimen were prepared by the same procedure as in Example 1, and the test specimen was evaluated. The results are given in Table 1. It showed lower blocking resistance but was on a level suitable for practical use.

EXAMPLE 3

In the ink of Example 1, the acrylic thermoplastic resin solution was totally replaced with an acrylic resin (methyl methacrylate resin; Tg 105° C.; solid matters 30%). Transparent conductive ink and test specimen were prepared by the same procedure as in Example 1, and the test specimen was evaluated. As shown in Table 1, the results were as satisfactory as in Example 1.

EXAMPLE 4

In the ink of Example 1, toluene to dilute the thermoplastic resin solution was totally replaced with xylene. The solvent is a mixture containing 70 weight parts of toluene and 70 weight parts of xylene, and this was prepared for application in hot season. Transparent conductive ink and test specimen were prepared by the same procedure as in Example 1. The test specimen was evaluated and the suitability for printing at air temperature of 30° C. was assessed. As shown in Table 1, it showed good printing property at air temperature of 30° C.

EXAMPLE 5

In the ink of Example 1, the content of tin oxide powder was decreased from 90 weight parts to 30 weight parts. Transparent conductive ink and test specimen were prepared by the same procedure as in Example 1, and surface resistance was in the order of $10^9$ $\Omega/\square$ as shown in Table 1.

EXAMPLE 6

In the ink of Example 1, the content of tin oxide powder was increased from 90 weight parts to 120 weight parts. Transparent conductive ink and test specimen were prepared by the same procedure as in Example 1, and the test specimen was evaluated.

As shown in Table 1, surface resistance was in the order of $10^5$ $\Omega/\square$. Compared with Example 1, surface resistance was not substantially different. Cloudiness and freshness of picture pattern were inferior but it was on a level suitable for practical use.

COMPARATIVE EXAMPLE 1

In the ink of Example 1, the acrylic thermoplastic resin was totally replaced with an acrylic resin (ethyl methacrylate resin; Tg 40° C.; solid matter 30%). Transparent conductive ink and test specimen were prepared by the same procedure as in Example 1, and the test specimen was evaluated. As shown in Table 1, blocking resistance was slightly inferior.

COMPARATIVE EXAMPLE 2

In the ink of Example 1, the content of tin oxide powder was decreased from 90 weight parts to 25 weight parts. Transparent conductive ink and test specimen were prepared by the same procedure as in Example 1, and the test specimen was evaluated. As shown in Table 1, surface resistance was in the order of $10^{11}$ $\Omega/\square$. Compared with Example 5, surface resistance was somewhat lower and it was not suitable for practical use.

The method to evaluate the test specimens was as follows:
(1) Surface resistance ($\Omega/\square$)

This was determined using Hirester-IP HT-210 (Yuka Electronics Co., Ltd.).
(2) Freshness of picture pattern By visual inspection, picture pattern was compared with a transparent conductive layer without picture pattern. Double circle mark in the Table indicates that freshness of picture pattern was higher than the one marked with a circle.
(3) Blocking resistance In an atmosphere of 50° C. and 80% relative humidity, picture patterns of the printed materials were overlapped upon one another, and a load of 5 kg/cm² was applied and the materials were left to stand for 20 hours. Thereafter, the load was removed, and blocking or sticking of the two printed materials was assessed. Double circle mark indicates that there was no sticking. Circle mark indicates that there was some sticking but picture pattern was not affected. Triangle mark indicates that there was sticking and picture pattern was damaged when peeled off.
(4) Suitability for gravure printing This was evaluated using a sheet-fed gravure printing proof press (Type: D tester). Double circle mark indicates that continuous printing can be achieved for more than 2 hours. Circle mark indicates that continuous printing can be achieved for 1 to 2 hours. Triangle mark indicates that continuous printing can be performed for 0.5 to 1 hour.

TABLE 1

| | Surface resistance ($\Omega/\square$) | Freshness of picture pattern | Blocking resistance | Suitability for gravure printing (air temp.) 20° C. | 30° C. |
|---|---|---|---|---|---|
| Example 1 | $9 \times 10^5$ | ◎ | ◎ | ◎ | ○ |
| Example 2 | $1 \times 10^6$ | ◎ | ○ | ◎ | ○ |
| Example 3 | $3 \times 10^6$ | ◎ | ◎ | ◎ | ○ |
| Example 4 | $9 \times 10^5$ | ◎ | ◎ | ○ | ◎ |
| Example 5 | $7 \times 10^8$ | ◎ | ○ | ◎ | ○ |
| Example 6 | $9 \times 10^5$ | ○ | ◎ | ○ | △ |
| Comparative example 1 | $2 \times 10^6$ | ◎ | △ | ◎ | ○ |
| Comparative example 2 | $8 \times 10^{11}$ | ◎ | ◎ | ◎ | ○ |

Next, transparent conductive ink prepared in Example 1 was coated on a polyethylene terephthalate film (film thickness: 125 μm) to have dry film thickness of about 1 μm using a bar coater, and a test specimen was prepared. Surface resistance was determined by the same procedure as in Example 1, and cloudiness was determined by the method described below. The results are given in Table 2.
(5) Cloudiness This was determined using direct-reading haze computer (Suga Tester Co., Ltd.).

TABLE 2

| | Surface resistance ($\Omega/\square$) | Cloudiness |
|---|---|---|
| Example 1 | $8 \times 10^5$ | 19 |
| Example 2 | $8 \times 10^5$ | 13 |
| Example 3 | $2 \times 10^6$ | 12 |
| Example 4 | $8 \times 10^5$ | 20 |
| Example 5 | $4 \times 10^9$ | 12 |
| Example 6 | $7 \times 10^5$ | 30 |
| Comparative example 1 | $1 \times 10^6$ | 15 |
| Comparative example 2 | $3 \times 10^{11}$ | 10 |

What we claim are:

1. A printed matter having a transparent conductive film formed by gravure printing on a surface of a multicolored picture pattern produced by offset printing on a base material, said transparent conductive film being formed via a transparent primer layer of 1–10 $\mu$m in thickness selected from gravure varnish or OP varnish for offset, said film comprising an acrylic thermoplastic resin having a glass transition temperature of 50° C. to 105° C., a transparent conductive powder being selected from at least one of tin oxide doped with metals having different valence, zinc antimonate, or indium tin oxide, and having average particle size of not more than 1 $\mu$m, and a solvent being at least one of toluene or xylene, whereby said printed matter is formed by a transparent conductive ink containing said conductive powder in an amount of 100 to 500 weight parts to 100 weight parts of the thermoplastic resin.

2. A printed matter according to claim 1, wherein said base material is a paper base material.

3. A printed matter according to claim 2, wherein said printed matter is formed to a book by overlapping the picture patterns on each other.

* * * * *